US011130301B2

(12) United States Patent
Furubayashi

(10) Patent No.: US 11,130,301 B2
(45) Date of Patent: Sep. 28, 2021

(54) DEVICE AND METHOD FOR MANUFACTURING CYLINDRICAL MEMBER

(71) Applicant: The Yokohama Rubber Co., LTD., Tokyo (JP)

(72) Inventor: Yuki Furubayashi, Shinshiro (JP)

(73) Assignee: The Yokohama Rubber Co., LTD.

( * ) Notice: Subject to any disclaimer, the term of this patent is extended or adjusted under 35 U.S.C. 154(b) by 76 days.

(21) Appl. No.: 16/333,214

(22) PCT Filed: Sep. 1, 2017

(86) PCT No.: PCT/JP2017/031544
§ 371 (c)(1),
(2) Date: Mar. 13, 2019

(87) PCT Pub. No.: WO2018/051812
PCT Pub. Date: Mar. 22, 2018

(65) Prior Publication Data
US 2019/0232589 A1  Aug. 1, 2019

(30) Foreign Application Priority Data
Sep. 16, 2016 (JP) .............................. JP2016-181590

(51) Int. Cl.
*B29D 30/26* (2006.01)
*B29C 65/78* (2006.01)
(Continued)

(52) U.S. Cl.
CPC .......... *B29D 30/26* (2013.01); *B29C 65/7841* (2013.01); *B29C 65/7844* (2013.01);
(Continued)

(58) Field of Classification Search
CPC .... B29D 2030/2685; B29D 2030/4487; B29D 30/26; B29D 30/58; B29C 53/42;
(Continued)

(56) References Cited

U.S. PATENT DOCUMENTS

| 5,080,738 A | * | 1/1992 | Araki | ..................... B29D 30/48 |
| | | | | 156/132 |
| 2004/0239134 A1 | | 12/2004 | Fukazawa | |
| 2015/0083301 A1 | | 3/2015 | Fischer et al. | |

FOREIGN PATENT DOCUMENTS

| JP | 60-219038 A | * | 11/1985 |
| JP | H03-061031 | | 3/1991 |

(Continued)

OTHER PUBLICATIONS

International Search Report for International Application No. PCT/JP2017/031544 dated Dec. 5, 2017, 4 pages, Japan.

*Primary Examiner* — Geoffrey L Knable
(74) *Attorney, Agent, or Firm* — Thorpe North & Western

(57) ABSTRACT

A cylindrical member manufacturing device is provided. A rear end of an arm is rotatably supported by a base fixed to a rotation shaft coaxial with a drum shaft and separated from the drum shaft in a drum width direction; the arm is set to rotate in a direction so that a front end moves toward and away from an outer circumferential surface of a forming drum; and the base, the arm, and the rotation shaft are integrally rotated about the rotation shaft with the rotating forming drum with the front end moved toward the outer circumferential surface and the arm pressing a front end of a band-like rubber member disposed on the outer circumferential surface and holding a first end on the outer circumferential surface in order to wind the band-like rubber member around the outer circumferential surface and form the band-like rubber member into a cylindrical shape.

12 Claims, 8 Drawing Sheets

(51) Int. Cl.
*B29C 53/56* (2006.01)
*B29L 22/02* (2006.01)

(52) U.S. Cl.
CPC ...... *B29C 53/56* (2013.01); *B29D 2030/2614* (2013.01); *B29D 2030/2685* (2013.01); *B29L 2022/025* (2013.01)

(58) Field of Classification Search
CPC ..... B29C 53/44; B29C 53/56; B29C 65/7841; B29C 65/7844
See application file for complete search history.

(56) References Cited

FOREIGN PATENT DOCUMENTS

| | | |
|---|---|---|
| JP | H06-126858 | 5/1994 |
| JP | H07-080963 | 3/1995 |
| JP | H08-229754 | 9/1996 |
| JP | 2001-191422 | 7/2001 |
| JP | 2004-351572 | 12/2004 |
| JP | 2011-037078 | 2/2011 |
| JP | 2015-536844 | 12/2015 |
| WO | WO 2014/073953 | 5/2014 |

\* cited by examiner

DEVICE AND METHOD FOR MANUFACTURING CYLINDRICAL MEMBER

TECHNICAL FIELD

The present technology relates to a device and method for manufacturing a cylindrical member and particularly relates to a device and method for manufacturing a cylindrical member with high versatility in which, when winding a band-like rubber member and forming the band-like rubber member into a cylindrical shape, a first end portion corresponding to a winding starting point of the band-like rubber member can be securely fixed to an outer circumferential surface of a forming drum of various types at a predetermined position.

BACKGROUND ART

In the tire manufacturing process, various cylindrical members such as a tread rubber, a side rubber, and the like are manufactured using an unvulcanized band-like rubber member. In manufacturing these cylindrical members, for example, a band-like rubber member is wound around the outer circumferential surface of a forming drum and formed into a cylindrical shape. At this time, a method may be used that includes adhering/holding and fixing a winding starting end portion of the band-like rubber member with an adhesion pad embedded in the outer circumferential surface of the forming drum. However, the adhesion pad may be unable to be installed depending on the specifications of the forming drum.

Another proposed technology for winding the band-like rubber member around the outer circumferential surface of the forming drum is a tracking device including a pair of arms fixed to a drum axle of a forming drum that extend outward toward the outer circumferential surface of the drum, with a rod-like fixing body mounted between the arms (see paragraph [0045] and FIGS. 9 and 10 of Japan Unexamined Patent Publication No. 2015-536844). In this tracking device, the rod-like fixing body is urged toward the drum outer circumferential surface by a spring and is pressed against the surface of the winding starting portion of a tire layer (unvulcanized band-like rubber member) to hold and fix the winding starting portion to the drum outer circumferential surface.

This tracking device cannot be used in forming drums that include an expanding molding bladder on the drum outer circumferential surface because the rod-like fixing body disposed above the outer circumferential surface of the forming drum and traversing the outer circumferential surface in the drum width direction becomes an obstruction. To take the tire layer off from the forming drum, the tire layer having been wound around the drum outer circumferential surface and formed into a cylindrical, the tracking device needs to be disassembled. Furthermore, when the winding starting portion of the tire layer is disposed on the drum outer circumferential surface, it is also necessary to precisely control the positions of the winding starting portion and the fixing body disposed traversing the drum outer circumferential surface so that they do not interfere with each other.

SUMMARY

The present technology provides a device and method for manufacturing a cylindrical member with high versatility in which, when winding a band-like rubber member and forming the band-like rubber member into a cylindrical shape, a first end portion corresponding to a winding starting point of the band-like rubber member can be securely fixed to an outer circumferential surface of a forming drum of various types at a predetermined position.

A device for manufacturing a cylindrical member according to an embodiment of the present technology includes:

a forming drum including an outer circumferential surface on which an unvulcanized band-like rubber member is wound; and a holder that presses and holds a first end portion corresponding to a winding starting point of the band-like rubber member on the outer circumferential surface; wherein the holder includes a rotation shaft coaxial with a drum shaft of the forming drum and disposed separated from the drum shaft by an interval in a drum width direction;

a base portion fixed to the rotation shaft; and an arm that rotates and includes a rear end portion rotatably supported by the base portion;

a rotation direction of the arm is set in a direction in which a front end portion of the arm moves toward and away from the outer circumferential surface;

when the front end portion is moved toward the outer circumferential surface, the arm presses the first end portion disposed on the outer circumferential surface and holds the first end portion on the outer circumferential surface; and the base portion and the arm are integrally rotatable about the rotation shaft.

A method according to an embodiment of the present technology for manufacturing a cylindrical member, in which an unvulcanized band-like rubber member is wound around an outer circumferential surface of a forming drum and formed in a cylindrical shape by rotating the forming drum with a first end portion that corresponds to a winding starting point of the band-like rubber member pressed and held on the outer circumferential surface, includes:

fixing a base portion to a rotation shaft coaxial with a drum shaft of the forming drum and disposed separated from the drum shaft by an interval in a drum width direction;

setting an arm to rotate in a direction so that a front end portion of the arm moves toward and away from the outer circumferential surface by a rear end portion of the arm being rotatably supported by the base portion;

pressing the first end portion disposed on the outer circumferential surface and holding the first end portion on the outer circumferential surface with the arm by moving the front end portion towards the outer circumferential surface; and integrally rotating the base portion and the arm about the rotation shaft together with the rotating forming drum.

According to the present technology, using a mechanism, including the rotation shaft coaxial with the drum shaft and disposed separated from the drum shaft in a drum width direction, a base portion, and an arm, the first end portion of the band-like rubber member is pressed and held on the outer circumferential surface of the forming drum. Accordingly, even for forming drums having different specifications, the first end portion of the band-like rubber member can be securely fixed on the outer circumferential surface of the forming drum at a predetermined position by the arm. Moreover, by rotating the arm in a direction in which the front end portion of the arm moves away from the outer circumferential surface of the forming drum, the band-like rubber member can be disposed on the outer circumferential surface of the forming drum without the arm becoming an obstruction.

Even in the process of rotating the forming drum and winding the band-like rubber member around the outer circumferential surface, the arm with the front end portion moved toward the outer circumferential surface constantly holds and fixes the first end portion of the band-like rubber member disposed on the outer circumferential surface to the outer circumferential surface at a predetermined position. Accordingly, high versatility is achieved by being able to suppress the deviation of the band-like rubber member and form the band-like rubber member into a cylindrical member for forming drums of various types.

DETAILED DESCRIPTION

Figure 1:
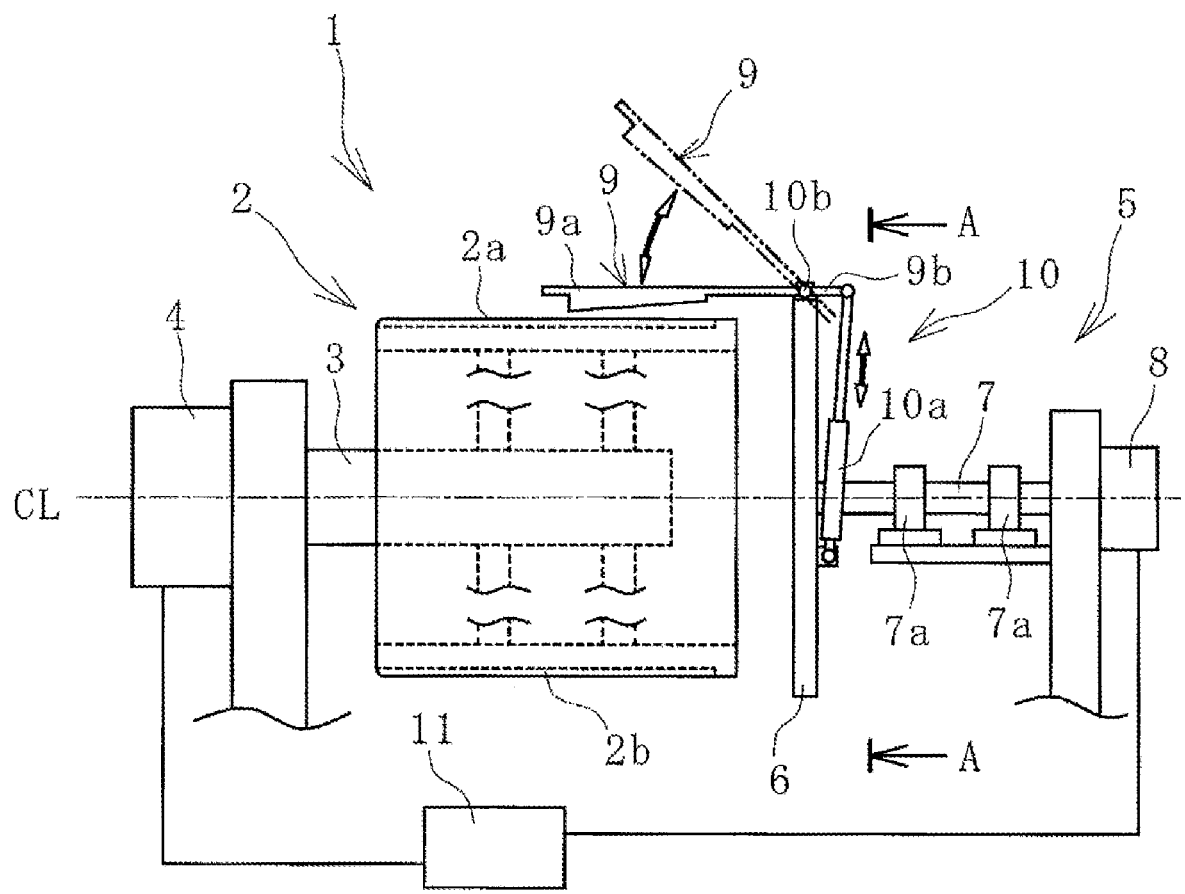
FIG. 1 is an explanatory diagram illustrating in a front view a device for manufacturing a cylindrical member according to an embodiment of the present technology.

Hereinafter, a device and method for manufacturing a cylindrical member of the present technology will be specifically described based on embodiments illustrated in the drawings.

Figure 2:
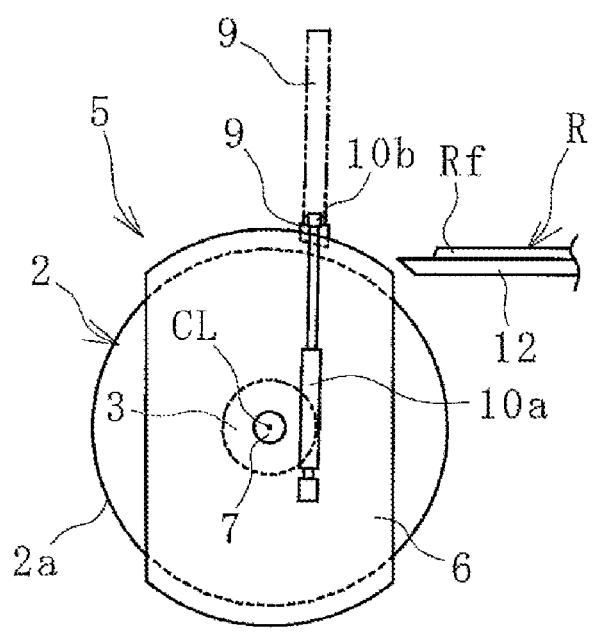
FIG. 2 is an explanatory diagram illustrating the manufacturing device of FIG. 1 viewed in the direction of the arrows A-A.
Figure 6:
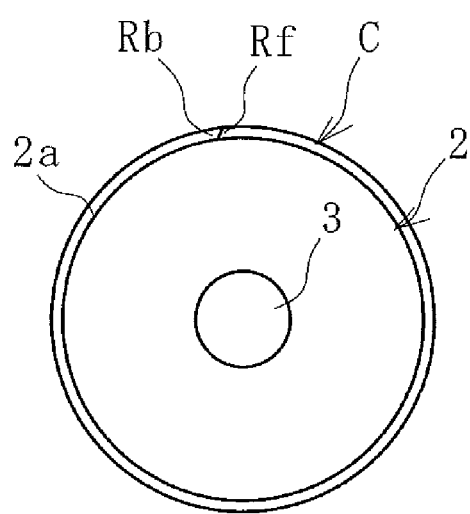
FIG. 6 is an explanatory diagram illustrating a cylindrical member formed on the forming drum in a side view.

A device 1 for manufacturing a cylindrical member (hereinafter, referred to as manufacturing device 1) according to an embodiment of the present technology illustrated in FIG. 1 and FIG. 2 is provided with a forming drum 2 and a holder 5. The manufacturing device 1 forms an unvulcanized band-like rubber member R into a cylindrical member C as illustrated in FIG. 6. Examples of the cylindrical member C include a tire tread rubber, a side rubber, and various members used in the manufacture of a tire and other rubber products.

The forming drum 2 is a cylindrical body including a drum shaft 3 and is cantilevered by a frame or the like. At least a portion of the forming drum 2 can be expanded and contracted in the radial direction. One end portion of the drum shaft 3 is connected to a drum shaft drive motor 4 for rotationally driving the drum shaft 3. In other words, the drum shaft 3 is a drive shaft that rotates and drives. Note that the dot-dash line CL in the drawings represents the axial center position of the drum shaft 3.

In this embodiment, the forming drum 2 includes a shaping bladder 2b that expands on an outer circumferential surface 2a of the forming drum 2. Generally, as illustrated in FIG. 1, the shaping bladder 2b is in an uninflated state, and when necessary, air is injected into the shaping bladder 2b to expand it radially outward.

The actuation of the drum shaft drive motor 4 is controlled by a control unit 11. Accordingly, the rotation, stopping of the rotation, and rotational speed (rotational angular velocity) of the forming drum 2 are controlled by the control unit 11.

The holder 5 is provided separately from the forming drum 2 as a separate body. The holder 5 includes a rotation shaft 7, a base portion 6 fixed to the rotation shaft 7, and an arm 9 that rotates and includes a rear end portion 9b that is rotatably supported at the base portion 6.

The rotation shaft 7 is coaxial with the drum shaft 3 and is disposed separated from the drum shaft 3 by an interval in the drum width direction. Note that the axial center of the drum shaft 3 and the axial center of the rotation shaft 7 are generally aligned but do not have to be perfectly aligned. One end portion of the rotation shaft 7 is connected to a rotation shaft drive motor 8 for rotationally driving the rotation shaft 7. In other words, the rotation shaft 7 is a drive shaft that rotates and drives. The rotation shaft 7 is rotatably supported by a suitable number of bearings 7a disposed partway along the rotation shaft 7 in the longitudinal direction.

The base portion 6 is a plate-like body or a frame structure and is fixed to the other end portion of the rotation shaft 7. In this embodiment, the shape of the base portion 6 in a front view is substantially quadrangular with a pair of opposite arcuate sides and a pair of opposite linear sides as illustrated in FIG. 2. The shape of the base portion 6 is not limited to this shape, and various shapes such as, for example, circular shapes can be adopted.

The base portion 6 is provided with the arm 9 and an arm actuating mechanism 10 for rotating the arm 9. The arm 9 is a rod-like body, and the rear end portion 9b thereof is rotatably supported by a support shaft 10b fixed to an edge of the base portion 6.

In this embodiment, the arm actuating mechanism 10 includes the actuator 10a and the support shaft 10b. Examples of the actuator 10a include an air cylinder, a hydraulic cylinder, and the like. The rear end of the arm 9 positioned further toward the back side than the position, where the arm 9 is supported by the support shaft 10b, and a front end portion of a moving rod of the actuator 10a are rotatably connected.

When the rod of the actuator 10a moves, the arm 9 rotates about the support shaft 10b. The rotation direction of the arm 9 is set in the direction in which the front end portion 9a of the arm 9 moves toward and away from the outer circumferential surface 2a of the forming drum 2. When the rod of the actuator 10a retracts (contracts), the front end portion 9a of the arm 9 rotating about the support shaft 10b moves away from the outer circumferential surface 2a as illustrated by the two-dot chain line in the drawings. When the rod of the actuator 10a advances (extends), the front end portion 9a of the arm 9 rotating about the support shaft 10b moves toward the outer circumferential surface 2a.

The base portion 6, the arm 9, and the arm actuating mechanism 10 rotate integrally with the rotation shaft 7 about the rotation shaft 7. The actuation of the rotation shaft drive motor 8 is controlled by the control unit 11. Thus, the integral rotation, stopping of the rotation, and rotational speed (angular velocity) of the rotation shaft 7, the base portion 6, the arm 9, and the arm actuation mechanism 10 are controlled by the control unit 11.

The steps of a method for manufacturing a cylindrical member according to an embodiment of the present technology will be described below.

The band-like rubber member R in a flat state is supplied and conveyed by a member supplier 12 onto the forming drum 2, starting with a first end portion Rf. At this time, the drum shaft 3 and the rotation shaft 7 are in a non-rotating state. The arm 9 is at rest at a standby position (the position indicated with a two-dot chain line in FIG. 1) where the front end portion 9a is separated from the outer circumferential surface 2a.

The first end portion Rf of the supplied band-like rubber member R is disposed on the outer circumferential surface 2a of the forming drum 2. The first end portion Rf corresponds to the winding starting point of the band-like rubber member R on the forming drum 2. In an embodiment of the present technology, by putting the arm 9 at rest in the standby position by rotating the arm 9 about the support shaft 10b, a wide interval between the arm 9 and the outer circumferential surface 2a can be ensured. Accordingly, the supplied band-like rubber member R and the arm 9 do not readily interfere with each another, allowing the band-like rubber member R to be smoothly disposed on the outer circumferential surface 2a.

Figure 3:
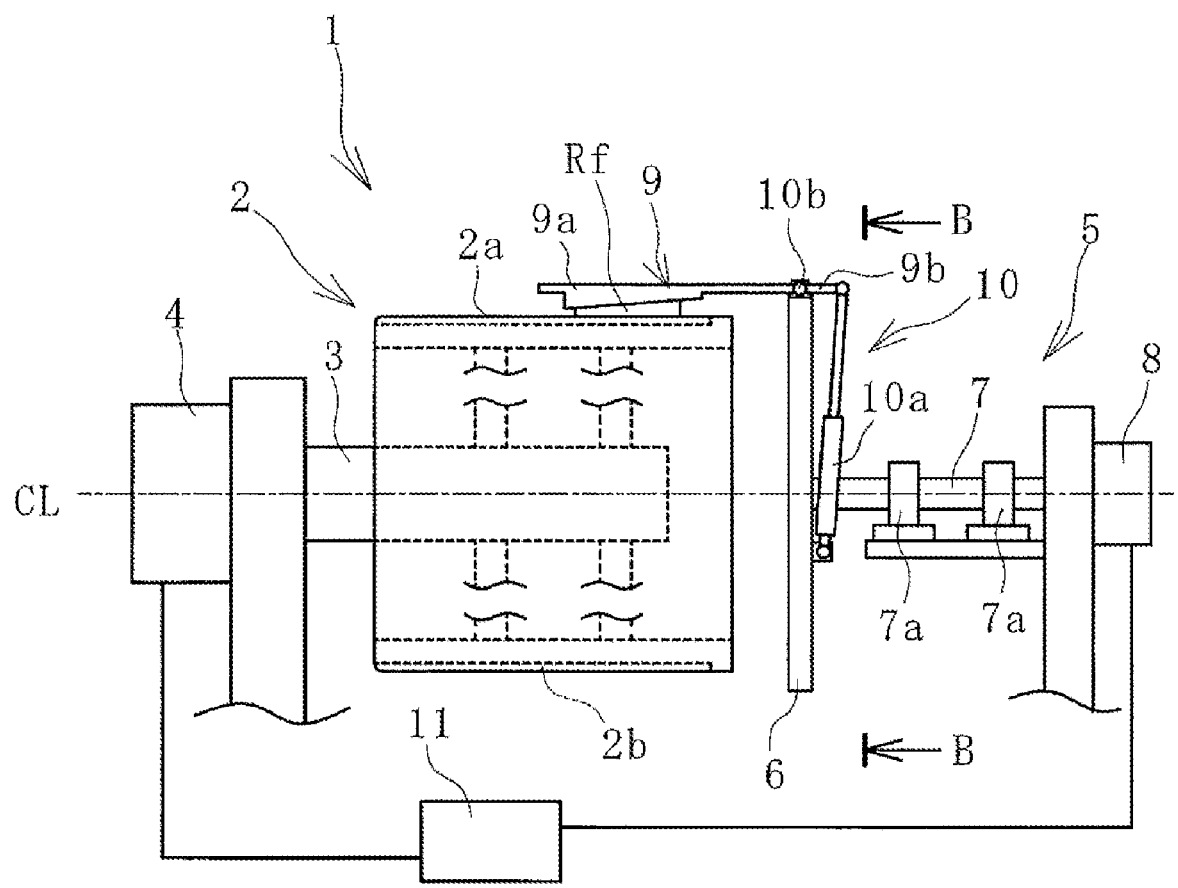
FIG. 3 is an explanatory diagram illustrating in a front view a winding starting point of a band-like rubber member being held and fixed to the outer circumferential surface of the forming drum by the arm illustrated in FIG. 1.
Figure 4:
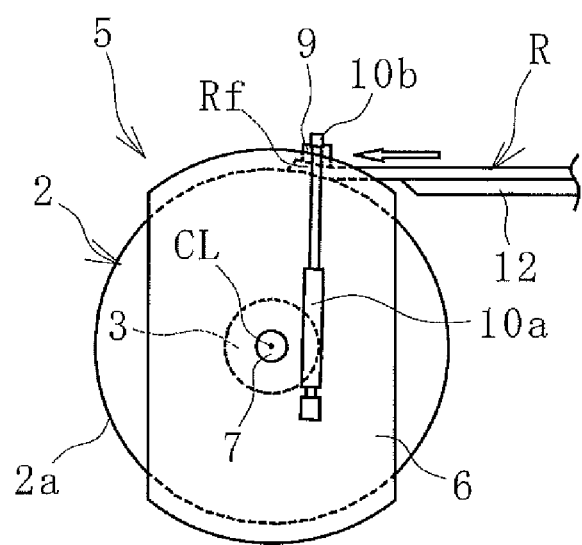
FIG. 4 is an explanatory diagram illustrating the state of FIG. 3 viewed in the direction of the arrows B-B.

Immediately after the band-like rubber member R is disposed on the outer circumferential surface 2a, the arm 9 is rotated in a direction that brings the front end portion 9a toward the outer circumferential surface 2a. In this way, as illustrated in FIGS. 3 and 4, the first end portion Rf of the band-like rubber member R is pressed against the outer circumferential surface 2a at a predetermined position by the arm 9, and held and fixed between the arm 9 and the outer circumferential surface 2a.

In an embodiment such as this in which the shaping bladder 2b is provided on the outer circumferential surface 2a of the forming drum 2, a fixing unit such as an adhesion pad that fixes the first end portion Rf of the band-like rubber member R to the outer circumferential surface 2a cannot be provided. Thus, conventionally, it has been difficult to fix the first end portion Rf of the band-like rubber member R to be wound to the outer circumferential surface 2a at a predetermined position. However, according to the present technology, the first end portion Rf of the band-like rubber member R can be firmly fixed to the outer circumferential surface 2a at a predetermined position by the arm 9.

Figure 5:
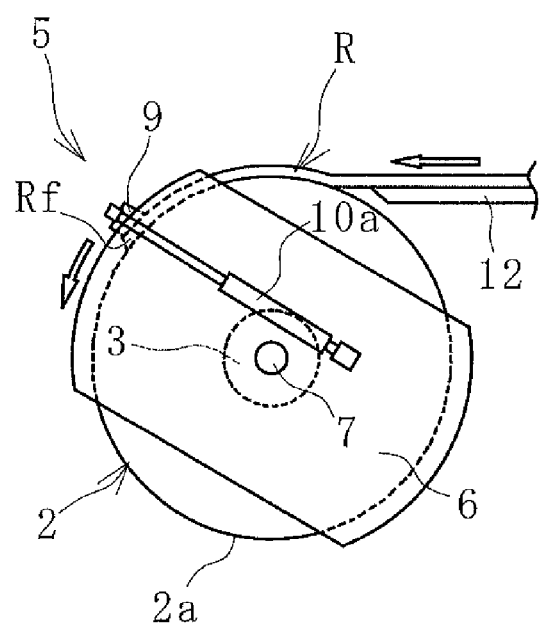
FIG. 5 is an explanatory diagram illustrating the band-like rubber member being wound around the forming drum of FIG. 4 in a side view.

With the first end portion Rf being held and fixed by the arm 9, the drum shaft 3 is rotationally driven as illustrated in FIG. 5, and the forming drum 2 is rotated about the drum shaft 3. At this time, the control unit 11 controls the rotation shaft 7 to rotate in the same direction and the same angular velocity as the drum shaft 3 in synchronization with the drum shaft 3. Accordingly, the base portion 6, the arm 9, and the arm actuating mechanism 10 rotate with the rotation shaft 7 about the rotation shaft 7 in synchronization with the forming drum 2, in the same direction and the same angular velocity as the forming drum 2.

The forming drum 2 rotates to wind the band-like rubber member R around the outer circumferential surface 2a. When the forming drum 2 rotates once, as illustrated in FIG. 6, the band-like rubber member R on the outer circumferential surface 2a is formed into a cylindrical shape, with the first end portion Rf and a second end portion Rb being joined together.

Because the arm 9 is also rotated together with the forming drum 2, the first end portion Rf of the band-like rubber member R is kept in a held and fixed state by the arm 9 on the outer circumferential surface 2a at a predetermined position. Centrifugal force directed further toward the outer circumference side acts on the first end portion Rf due to the rotation of the forming drum 2. However, the first end portion Rf is pressed by the arm 9 on the outer circumferential surface, preventing the first end portion Rf from peeling off from the outer circumferential surface 2a. That is, because the first end portion Rf is constantly held and fixed on the outer circumferential surface 2a at a predetermined position by the arm 9, the first end portion Rf can be joined to the second end portion Rb with minimal deviation.

Even when the forming drum 2 is provided with various mechanisms and parts, and hence there is no space for providing a new mechanism, the holder 5 can be provided adjacent to the forming drum 2 since it is a separate body from the forming drum 2. Thus, even in the case of the forming drum 2 including the shaping bladder 2b on the outer circumferential surface 2a, the holder 5 can be employed to hold and fix the first end portion Rf of the band-like rubber member R on the outer circumferential surface 2a at a predetermined position.

When a plurality of the forming drums 2 are pivotably provided and the forming drums 2 are successively moved to go through a process of forming the cylindrical member C and a process of removing the cylindrical member C from the forming drum 2, the cylindrical members C can be continuously manufactured. In such a manufacturing line, the cost required for the band-like rubber member R to be installed on each of the forming drums 2 is great. However, according to the present technology, only one holder 5 is required for the plurality of forming drum 2, allowing the equipment cost to be greatly reduced.

According to the present technology as described above, even for forming drums 2 having different specifications, the first end portion Rf of the band-like rubber member R can be securely fixed on the outer circumferential surface 2a at a predetermined position by the arm 9.

In this embodiment, a contact surface of the arm 9 where the arm 9 presses the first end portion Rf is formed in the same shape as the pressed surface shape of the first end portion Rf. That is, when the arm 9 comes into contact with the first end portion Rf disposed on the outer circumferential surface 2a, the contact surface of the arm 9 has a shape (inclined or ridged/grooved shape) similar to the surface shape of the first end portion Rf so that the entire contact surface of the arm 9 comes into contact with the surface of the first end portion Rf at an even surface pressure. Thus, the local deformation of the first end portion Rf due to the pressing of the arm 9 can be suppressed.

Figure 7:
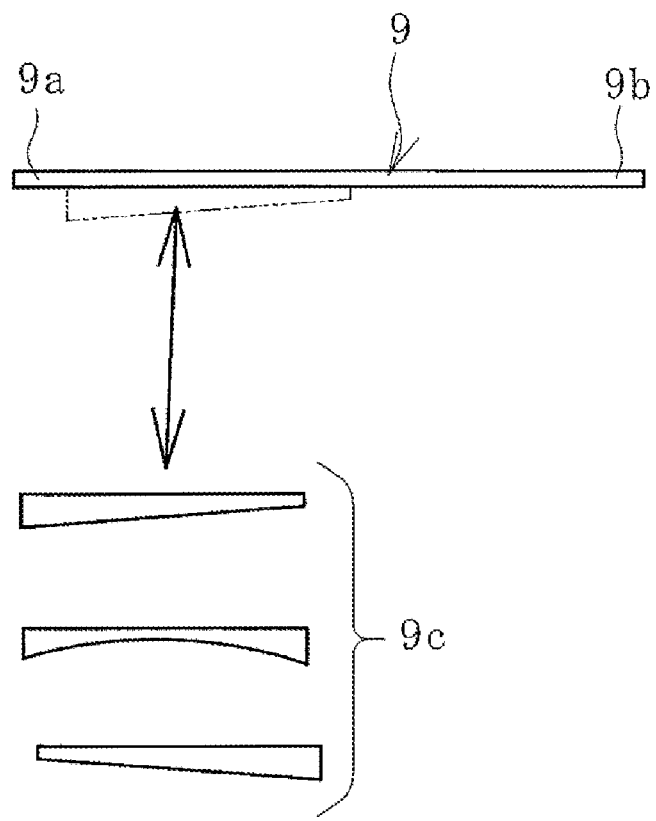
FIG. 7 is an explanatory diagram illustrating an arm according to a modified example.

Alternatively, as illustrated in FIG. 7, an attachment 9c that can be attached to and detached from the arm 9 can be provided. The attachment 9c is formed in the same shape as the surface shape of the first end portion Rf of the band-like rubber member R pressed by the arm 9. By preparing attachments 9c corresponding to the surface shapes of various band-like rubber members R, the attachment 9c may be attached to the arm 9 and used at any time.

Figure 8:
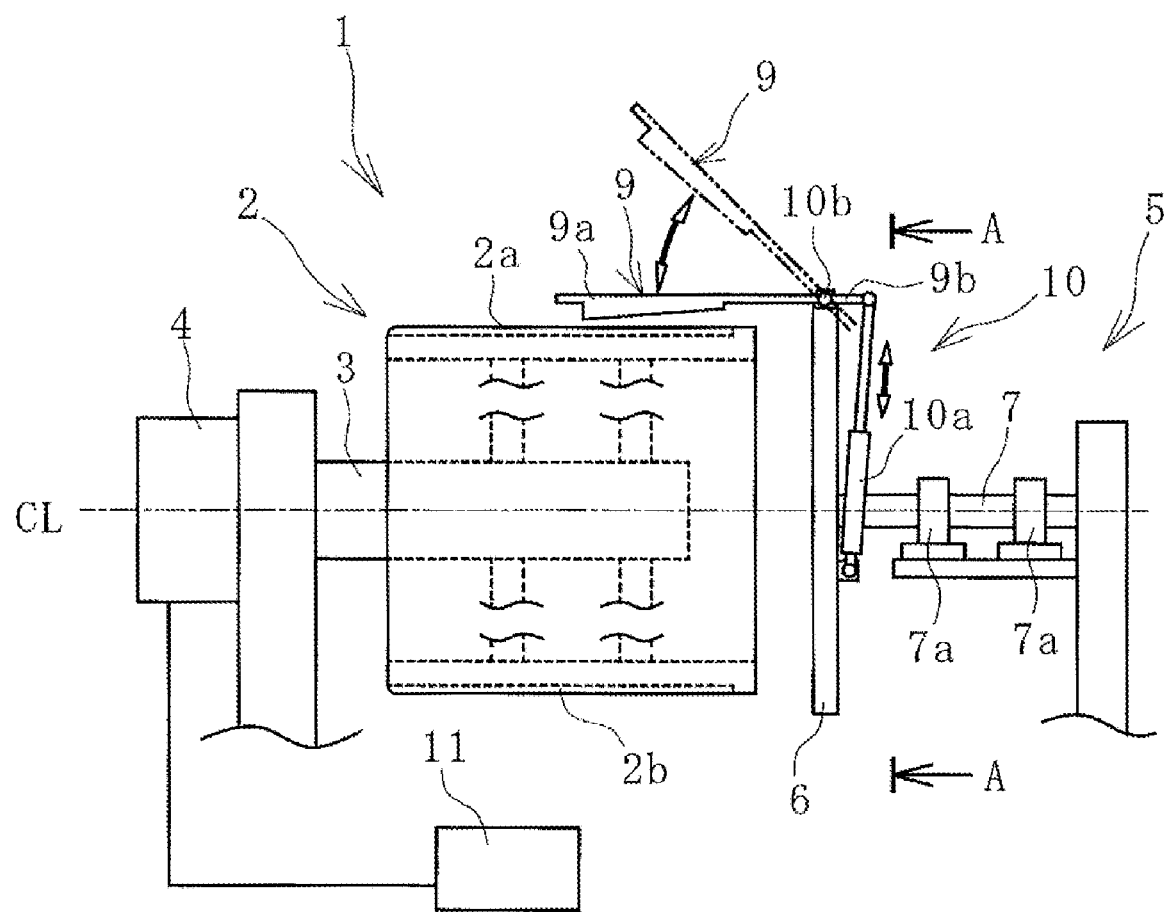
FIG. 8 is an explanatory diagram illustrating a manufacturing device according to another embodiment.

To rotate the rotation shaft 7 in synchronization with the forming drum 2 in the same direction with the same angular velocity as that of the forming drum 2, another method can be adopted. For example, unlike the previous embodiment, as illustrated in FIG. 8, the rotation shaft drive motor 8 may be not provided and the rotation shaft 7 may be a free rotating driven shaft rather than a drive shaft. In this case, the rotational force of the forming drum 2 is transmitted to the rotation shaft 7 through the arm 9 and the base portion 6 by rotationally driving the forming drum 2 in a state with the first end portion Rf of the band-like rubber member R disposed on the outer circumferential surface 2a pressed, held, and fixed by the arm 9. Thus, the base portion 6, the arm 9, and the arm actuating mechanism 10 can be rotated integrally with the rotation shaft 7 about the rotation shaft 7 in accordance with the rotation of the forming drum 2. In such an embodiment, a brake for stopping the rotation of the rotation shaft 7 is preferably provided. When stopping the rotation of the rotation shaft 7, the brake is activated. When rotating the rotation shaft 7, the brake is released.

Making the rotation shaft 7 a driven shaft has the advantage of making the rotation shaft drive motor 8 unnecessary. The control unit 11 does not need to control the rotational drive of the rotation shaft 7. On the other hand, because of the presence of rotational resistance in rotating the rotation shaft 7, a force in the rotation direction (drum circumferential direction) from the arm 9 acts on the first end portion Rf of the band-like rubber member R pressed by the arm 9. Accordingly, the first end portion Rf is easily deformed. Thus, an embodiment such as the previous embodiment in which the rotation shaft 7 is driven and synchronously rotates with the drum shaft 3 is advantageous in that the deformation of the first end portion Rf of the band-like rubber member R is suppressed.

The invention claimed is:

1. A device for manufacturing a cylindrical member, comprising:
    a forming drum comprising an outer circumferential surface on which an unvulcanized band-like rubber member is wound; and
    a holder that presses and holds a first end portion corresponding to a winding starting point of the band-like rubber member on the outer circumferential surface;
    the holder comprising
    a rotation shaft coaxial with a drum shaft of the forming drum and disposed separated from the drum shaft by an interval in a drum width direction;
    a base portion fixed to the rotation shaft; and
    an arm that rotates and comprises a rear end portion rotatably supported by the base portion;
    a rotation direction of the arm being set in a direction in which a front end portion of the arm moves toward and away from the outer circumferential surface;
    when the front end portion is moved toward the outer circumferential surface, the arm pressing the first end portion disposed on the outer circumferential surface and holding the first end portion on the outer circumferential surface;
    the drum shaft and the rotation shaft keep a state of being disposed separated from each other by the interval in the drum width direction, the interval between the rotation shaft and drum shaft being maintained the same: before the band-like rubber member is wound, during the winding of the band-like rubber member, when the arm is moved toward the outer circumferential surface to hold the first end portion, and when the arm is moved away from the outer circumferential surface; and
    the base portion and the arm being integrally rotatable with the rotation shaft; wherein:
    the rear end portion of the arm extends on an outer side of the base portion facing away from the forming drum;
    the arm extends further outward in the drum width direction than the base portion from the forming drum in the drum width direction; and
    an actuator is positioned on the outer side of the base portion for rotating the arm toward and away from the forming drum about a support shaft by advancing or retracting a rod of the actuator.

2. The device for manufacturing a cylindrical member according to claim 1, wherein
    the rotation shaft is a free-rotating driven shaft; and
    when the forming drum is rotatably driven in a state with the front end portion moved toward the outer circumferential surface so that the arm presses the first end portion disposed on the outer circumferential surface, the base portion and the arm integrally rotate with the rotation shaft in accordance with rotation of the forming drum.

3. The device for manufacturing a cylindrical member according to claim 2, wherein the forming drum comprises an expanding shaping bladder on the outer circumferential surface.

4. The device for manufacturing a cylindrical member according to claim 3, wherein
    a contact surface where the arm presses the first end portion is formed in an identical shape to a surface shape of the pressed first end portion or is a detachable attachment formed in an identical shape to the surface shape of the pressed first end portion.

5. The device for manufacturing a cylindrical member according to claim 1, wherein
    the rotation shaft is a drive shaft that rotatably drives; and
    the rotation shaft is rotated at an identical angular velocity and in an identical direction to that of the drum shaft in synchronization with the drum shaft.

6. The device for manufacturing a cylindrical member according to claim 5, wherein the forming drum comprises an expanding shaping bladder on the outer circumferential surface.

7. The device for manufacturing a cylindrical member according to claim 6, wherein
    a contact surface where the arm presses the first end portion is formed in an identical shape to a surface shape of the pressed first end portion or is a detachable attachment formed in an identical shape to the surface shape of the pressed first end portion.

8. The device for manufacturing a cylindrical member according to claim 1, wherein the forming drum comprises an expanding shaping bladder on the outer circumferential surface.

9. The device for manufacturing a cylindrical member according to claim 1, wherein
    a contact surface where the arm presses the first end portion is formed in an identical shape to a surface shape of the pressed first end portion or is a detachable attachment formed in an identical shape to the surface shape of the pressed first end portion.

10. The device for manufacturing a cylindrical member according to claim 1, wherein the actuator is coupled to the base portion on an opposite side of the rotation shaft as where the arm is positioned.

11. A method for manufacturing a cylindrical member in which an unvulcanized band-like rubber member is wound around an outer circumferential surface of a forming drum and formed in a cylindrical shape by rotating the forming drum in a state with a first end portion that corresponds to a winding starting point of the band-like rubber member pressed and held on the outer circumferential surface, the method comprising:
    fixing a base portion to a rotation shaft coaxial with a drum shaft of the forming drum and disposed separated from the drum shaft by an interval in a drum width direction;
    setting an arm to rotate in a direction so that a front end portion of the arm moves toward and away from the outer circumferential surface by a rear end portion of the arm being rotatably supported by the base portion;

extending the rear end portion of the arm on an outer side of the base portion facing away from the forming drum;

extending the arm further outward in the drum width direction than the base portion from the forming drum in the drum width direction;

positioning an actuator on the outer side of the base portion for rotating the arm toward and away from the forming drum about a support shaft by advancing or retracting a rod of the actuator;

pressing the first end portion disposed on the outer circumferential surface and holding the first end portion on the outer circumferential surface with the arm by moving the front end portion towards the outer circumferential surface;

and integrally rotating the base portion and the arm with the rotation shaft together with the rotating forming drum.

12. The method for manufacturing a cylindrical member according to claim 11, further comprising coupling the actuator is coupled to the base portion on an opposite side of the rotation shaft as where the arm is positioned.

* * * * *